United States Patent [19]

Hill

[11] Patent Number: 5,002,502

[45] Date of Patent: Mar. 26, 1991

[54] SATELLITE TV SYSTEM TO TUNER RECEIVER MAIN CABLE ARRAY WALL PLATE ASSEMBLY

[76] Inventor: Robert D. Hill, 9905 W. 243rd Ave., Schneider, Ind. 46376

[21] Appl. No.: 527,008

[22] Filed: May 22, 1990

[51] Int. Cl.⁵ ............................................. H01R 13/74
[52] U.S. Cl. ..................................... 439/536; 439/540
[58] Field of Search .............. 439/536, 540, 638, 535, 439/709; 174/66

[56] References Cited

U.S. PATENT DOCUMENTS

| | | | |
|---|---|---|---|
| 2,226,690 | 12/1940 | Bertold | 173/332 |
| 3,597,526 | 8/1971 | Boatwright et al. | 174/66 |
| 3,675,183 | 7/1972 | Drake | 339/103 R |
| 4,043,629 | 8/1977 | Brannen | 339/126 J |
| 4,451,108 | 5/1984 | Skidmore | 339/177 R |
| 4,558,172 | 12/1985 | Zetena | 174/66 |
| 4,673,235 | 6/1987 | Conley | 439/536 |
| 4,717,358 | 1/1988 | Chaundy | 439/557 |
| 4,721,476 | 1/1988 | Zeliff et al. | 439/536 |
| 4,747,786 | 5/1988 | Hayashi et al. | 439/578 |
| 4,797,507 | 1/1989 | Lofving | 439/572 |

OTHER PUBLICATIONS

Misco ® Computer Supplies and Accessories, Winter 1988 catalog, p. 104.

*Primary Examiner*—Gary F. Paumen
*Attorney, Agent, or Firm*—Richard G. Kinney

[57] ABSTRACT

A wall plate assembly for coupling satellite TV disk antennae multi-conductor cable array to tuner/receiver cables is disclosed. The assembly has a cover plate (11) for the room side of a wall opening and screws for connecting the plate to the wall about the opening. A pair of dual F female coaxial coupling members (30, 32) are provided integrally connected to the plate to allow coaxial cables to connect to either side of the plate. A plurality of non-coaxial connectors (41C, 41O, 41U, 41P, 41L, 41E, 41R and 41S) are provided which provide screw wire connectors at the room side and push/crimp wire connectors at the wall opening side of the cover plate.

7 Claims, 1 Drawing Sheet

SATELLITE TV SYSTEM TO TUNER RECEIVER MAIN CABLE ARRAY WALL PLATE ASSEMBLY

FIELD OF THE INVENTION

This invention relates to a new and improved wall plate assembly for intercoupling a satellite TV disk cable array and the tuner/receiver.

BACKGROUND OF THE INVENTION

Satellite TV broadcasting employs a satellite in geosynchronous orbit to broadcast TV signals to numerous antennae located across vast areas. The receiving antennae are almost always disk antennae, and for more northerly locations an weaker signals, these are commonly four, six, eight or more feet in diameter. These relatively large disk antennae are usually located outdoors. For home satellite TV reception, the disk antenna is usually permanently positioned on a concrete pad in the yard or ocassionally on the roof of the home. In the usual case, it is remote from the room where the receiver is located and a cable array is employed between the tuner/receiver and the antenna. Commonly, the disk is rotatable so as to be aimed toward different satellites and, because of the differing nature of the signal's broadcast from such satellites, it is also common to control other components of the antenna so as to be able to tune into different channels of satellite broadcasts. Thus, it is common to provide at least one and often two coaxial cables for connecting the received TV broadcast signals from the antenna to the tuner/receiver (usually located together indoors) while at the same time providing a number of control and power connections to the antenna apparatus for remote control of the antenna from the tuner/receiver.

To make running of the various cables easier, it is common to form them into a ribbon array with the cables side by side and interconnected by a common outer insulating plastic or rubber layer. And, like other ribbon cable arrays, individual cables may be split apart at the ends of the long arrays for connecting to the tuner/receiver or to intermediate lengths of individual cables which allow such connection.

The standard practice has been to run such cable arrays directly to the room in which the user wishes to have the tuner/receiver by cutting holes in walls and fishing the cable array through the holes. This often leaves unsightly holes and air leaks. The cables are sometimes subject to wear of harm by being exposed and/or by being abraded against the sides of a wall opening.

SUMMARY OF THE INVENTION

The satellite TV disk antenna to tuner/receiver wall plate assembly of the present invention allows for the main cable array coming into the home from the outdoor disk and its associated electronics to a plate at the wall of the room and connected to the tuner/receiver via feed-through connections and in-room cables.

A wall plate assembly constructed in accordance with the present invention includes a cover wall plate for the room side of a wall opening. Means for connecting the wall plate to the wall over the opening, such as a pair of screw-receiving openings and a couple of matching screws, are provided. At least one coaxial coupling member is provided integrally connected to the wall plate and having opposite ends on opposite sides of the plate. This allows a coaxial cable from the cable array to be connected to one end inside the opening. And this allows a second coaxial cable to be attached to the opposite end and to the tuner/receiver. A plurality of non-coaxial coupling members are integrally connected to the plate with opposite ends on opposite sides of the plate. This may include screw-type connectors on the room side for receiving wires from the tuner/receiver and crimp or push-in connectors on the opposite side for more permanent connection of the non-coaxial cables from the cable array.

The invention, together with further advantages and features thereof, may best be understood by reference to the following description taken in connection with the accompanying drawings, in the several figures of which, like reference numerals identify like elements.

DETAILED DESCRIPTION OF ONE PREFERRED EMBODIMENT

Figure 1:
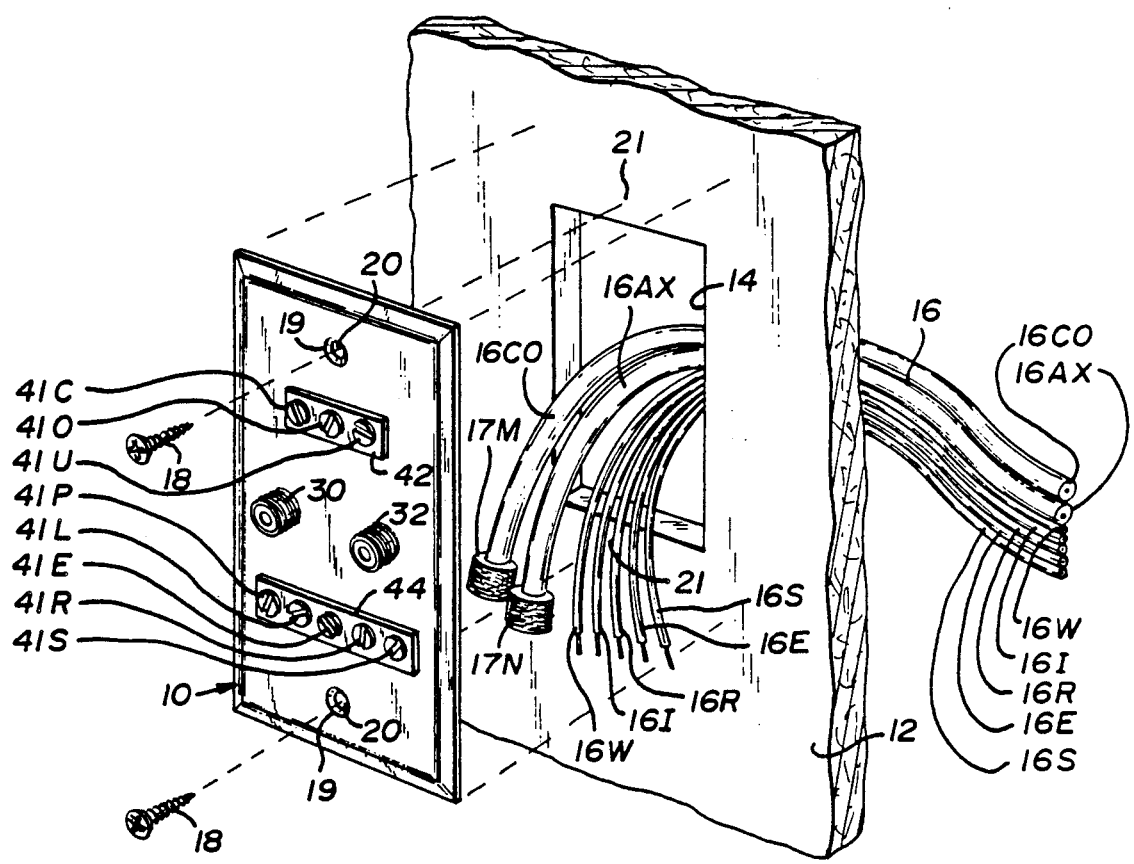
FIG. 1 is a fragmentary exploded perspective view of the satellite TV disk antenna to the tuner/receiver wall plate assembly of the present invention, shown with a TV satellite cable array and a wall having an opening therethrough.

Referring to the figures, the satellite TV system to tuner/receiver main cable array wall plate assembly of this invention is generally referred to by the number 10. In FIG. 1, the assembly 10 is shown aligned with a wall 12 which has an opening 14. The opening 14 preferably may be approximately three inches by two inches or slightly smaller. As shown, this allows a cable array 16 to be easily fished through the opening 14. The array 16 comprises a ribbon array of two coaxial cables 16CO and 16AX and five non-coaxial insulated signal wire cables 16W, 16I, 16R, 16E, and 16S As shown in FIG. 1, the cable array 16 is, after fishing through the opening 14, split into individual cables, and male couplers 17M and 17N are attached to the ends of coaxial cables 16CO, 16AX. The other cables 16W, 16I, 16R, 16E, and 16S are preferably also split apart from the ribbon and stripped for connection.

Figure 2:
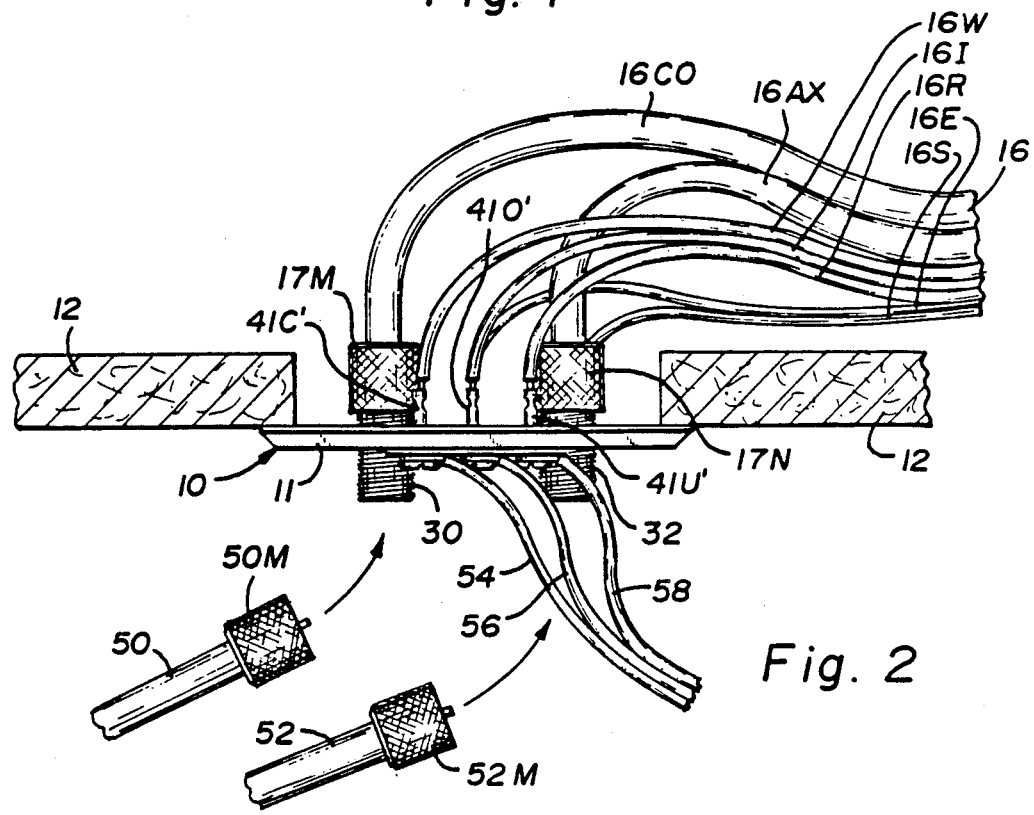
FIG. 2 is a top view of the invention installed to cover the wall opening and with the cables of the cable array connected thereto and some of the tuner/receiver cables connected thereto and in the process of being connected thereto.

As also can be seen from FIG. 1, the wall plate assembly 10 includes a plate 11 and means for affixing it to the wall 12 so as to cover the opening 14. These means may be the screws 18 shown or any other equivalent arrangement. The screws 18 have heads which are received into the bevelled portions 19 of holes 20 which pass through the plate 11. The screws 18 are received into the wall 12 at points 21 above and below the opening 14 and thus serve to secure the plate 11 across the opening 14, as shown in FIG. 2. The plate 11 is preferable made of metal or other good conductor for shielding and so it can be grounded, as will be explained later. The plate 11 is preferably at least two and three-quarters inches by four and one-half inches in its overall dimensions, so as to cover and overlap the wall opening 14.

A pair of coaxial cable coupling members 30, 32 are connected to the wall plate 11 and positioned on either side of its long axis center line at the middle of the plate 11. These are, preferably, double female "F" connectors and are positioned side by side but sufficiently inside of the side edges of the plate 11 so as to be spaced from the edge of the opening 14, as best shown in FIG. 2. The coupling members 30, 32 are secured to the plate 11 in a permanent manner, preferably welded or soldered in place. These couplers have external threads for receiving the coupling nut of the male connectors 17M or 17N or any like male coaxial connectors, as shown in FIG. 2. Since the external conductor of the coaxial cables 16CO and/or 16AX is conventionally grounded, this connection grounds the plate 11 and the external connector of the coaxial cables connected thereafter to the couplers 30 or 32.

The wall plate assembly 10 also includes a plurality of other couplers (signal wire receiving connectors) 41C, 41O, 41U, 41P, 41E, 41L, 41R, and 41S for non-coaxial cables. These are preferably mounted on and through insulating terminal blocks 40, 42 which preferably extend through the plate 11 at least around the couplers 41C-41S as they pass through the plate 11. The couplers are screw connections on the front side of the assembly 10 but include more permanent push-in and crimp connectors at their opposite ends, such as the ends 41C', 41D', 41U', shown in FIG. 2.

Thus, it can be appreciated that an opening 14 may be formed in a wall and the disk antenna cable array 16 fished through it and, after preparing the ends of the cables as shown in FIG. 1, cables 16CO and 16AX can be attached to the ends of the couplers 30, 32, and the cables 16W-16S attached to selective ones of the ends of the couplers 41C, 41O, 41U, 41P, 41L, 41E, 41R, and 41S, all on the rear side of the plate assembly 10. Once this is done, the assembly 10 may be secured over and close the opening 14, as shown in FIG. 2. At this point, the tuner/receiver coaxial cables such as the cables 50, 52 having male connectors 50M, 52M may be connected to the room end of the couplers 30, 32. And, as shown in FIG. 2, tuner/receiver control wires or cables such as cables 54, 56, and 58, may be connected to the screw terminal ends of the couplers 41C, 41O, 41U as shown, as well as to the other couplers 41P-41S, as are employed.

The structure of the couplers 41C-41S as well as that of the couplers 30, 32 may be and preferably are entirely conventional and therefore need not be detailed further here. Such couplers are commonly available, for example, from Radio Shack, as well as many other sources.

It should now be appreciated that a satellite TV disk antenna to tuner/receiver wall plate assembly has been provided which allows for the main cable array coming into the home from the outdoor disk and its associated electronics to a plate at the wall of the room and connected to the tuner/receiver via feed-through connections and in-room cables. The described inventive assembly provides both a decorative closure for the "fishing" opening into a room as well as a more secure means for connecting a tuner/receiver to the antenna cable array.

While one particular embodiment of the invention has been shown and described, it will be obvious to those skilled in the art that changes and modifications may be made without departing from the invention and, therefore, the aim in the appended claims is to cover all such changes and modifications as fall within the true spirit and scope of the invention.

I claim:

1. A wall plate assembly for remote satellite disk TV broadcast reception cable arrays, comprising:

a generally flat plate, having a front side and a rear side;

a first coaxial cable connection unit having a front end, an opposite end, and means for receiving and connecting to a coaxial cable at the opposite end of the unit, said first connection unit being secured to and through said plate with its said front end and said opposite end on opposite sides of said plate;

a first insulating terminal block connected to said plate and having a plurality of screw-type electrical connectors on the front side of said face plate, said terminal block being mounted at an opening of said face plate, each of which screw type connectors is electrically insulated from the other screw type connectors, and an equal number of signal wire-receiving connectors on said rear side of said face plate, each of said signal wire-receiving connectors being electrically insulated from the other signal wire-receiving connectors, but each also being electrically connected to a different one of said front side screw type connectors;

said face plate means further including means for connecting the plate to a wall.

2. The wall plate assembly of claim 1, wherein a second coaxial cable connection unit having means for receiving and connecting to a coaxial cable at the opposite end of the unit, said second connection unit being secured to and through said plate with its opposite sides on opposite sides of said plate.

3. The wall plate assembly of claim 2, wherein a second insulating terminal block connected to said plate and having a plurality of screw type of screw-type electrical connectors on the same front side of said face plate, each of which screw type connectors is electrically insulated from the other screw type connectors, and an equal number of single wire receiving connectors on said rear side of said foreplate, each of the single wire-receiving connectors being electrically insulated from the other single wire receiving connectors, but each also being electrically connected to a different one of said front side screw type connectors.

4. The wall plate assembly of claim 3, wherein each of said coaxial cable connection units has a female connector at each of its ends.

5. The wall plate assembly of claim 4, wherein each of said terminal blocks has at least three screw type connectors.

6. A wall plate assembly for use in a satellite TV system of the type which employs a cable array for feeding remote satellite disk received TV broadcast signals to an interior room and which receives control signals and power signals from the room and feeds these signals through that cable array from a cavity in a wall of that interior room, the cable array including at least two coaxial cables and a plurality of non-coaxial wires, all insulated from one another, said wall plate assembly comprising:

wall plate means having a rear side and front side with at least two coaxial connector units mounted therein with coaxial cable connection means provided on both the front side and the rear side of said wall plate means, whereby at least two of the cable array coaxial cables may be connected to the rear side of the wall plate means and signals fed through the cable end, the coaxial connector units to be available at said units at the front side of said coupler means; said face plate means further including insulating terminal block means including a plurality of screw-type electrical connectors on the front side of said face plate, said terminal block means being mounted in an opening in said face plate, each of which screw type connectors is electrically insulated from the other screw type connectors, and an equal number of signal wire-receiving connectors on said rear side of said face plate, each of said signal wire-receiving connectors being electrically insulated from the other signal wire-receiving connectors, but each also being electrically connected to a different one of said front said screw type connectors, and said face plate means further including means for connecting the face plate to a wall and over the opening in the wall with said cables and wires of said cable array connected to the connectors at the rear side of said face plate means and individual coaxial cables on the rear side and individual signalling and power wires being connectable to said connectors on the front side of said face plate means.

7. The wall plate assembly of claim 6, wherein said terminal block means includes two separate terminal blocks, each of which contains a plurality of said screw wire connectors.

* * * * *

UNITED STATES PATENT AND TRADEMARK OFFICE
CERTIFICATE OF CORRECTION

PATENT NO. : 5,002,502
DATED     : March 26, 1991
INVENTOR(S) : Robert D. Hill

It is certified that error appears in the above-identified patent and that said Letters Patent is hereby corrected as shown below:

Column 1, line 15, delete "an" and substitute --and--.

Column 1, line 20, delete "ocassionally" and substitute --occasionally--.

Column 1, line 49, delete "of" and substitute --or--.

Column 2, line 58, delete "preferable" and substitute --preferably--.

Column 5, line 11, after "front", delete "said" and substitute --side--.

Signed and Sealed this

First Day of September, 1992

Attest:

DOUGLAS B. COMER

Attesting Officer

Acting Commissioner of Patents and Trademarks